(12) United States Patent
Li et al.

(10) Patent No.: US 9,390,072 B2
(45) Date of Patent: Jul. 12, 2016

(54) METHOD AND DEVICE FOR ENLARGING DISPLAYED FONT

(71) Applicant: Xiaomi Inc., Beijing (CN)

(72) Inventors: Minghao Li, Beijing (CN); Jun Yuan, Beijing (CN); Jinxiang Liang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/460,793

(22) Filed: Aug. 15, 2014

(65) Prior Publication Data

US 2015/0145869 A1    May 28, 2015

Related U.S. Application Data

(63) Continuation of application No. PCT/CN2014/077094, filed on May 9, 2014.

(30) Foreign Application Priority Data

Nov. 27, 2013 (CN) .......................... 2013 1 0613054

(51) Int. Cl.
  *G09G 5/26* (2006.01)
  *G06F 17/21* (2006.01)

(52) U.S. Cl.
  CPC .................................. *G06F 17/214* (2013.01)

(58) Field of Classification Search
  CPC combination set(s) only.
  See application file for complete search history.

(56) References Cited

U.S. PATENT DOCUMENTS

| 6,252,596 | B1 | 6/2001 | Garland |
| 8,531,461 | B2 * | 9/2013 | Fenn .................... G06F 3/04886 345/467 |
| 2004/0117197 | A1 | 6/2004 | Dutta et al. |
| 2004/0136570 | A1 * | 7/2004 | Ullman ................ G09B 21/008 382/114 |
| 2011/0124362 | A1 | 5/2011 | Wakasa et al. |
| 2011/0224967 | A1 | 9/2011 | Van Schaik |
| 2013/0286024 | A1 * | 10/2013 | Huang ...................... G06T 3/40 345/472.2 |

FOREIGN PATENT DOCUMENTS

| CN | 101010664 | 8/2007 |
| CN | 101119551 | 2/2008 |

(Continued)

OTHER PUBLICATIONS

International Search Report of PCT/CN2014/077094, mailed from the State Intellectual Property Office of China on Sep. 2, 2014.

(Continued)

*Primary Examiner* — M Good Johnson
(74) *Attorney, Agent, or Firm* — Finnegan, Henderson, Farabow, Garrett & Dunner LLP

(57) ABSTRACT

A method for a device to enlarge a displayed font, includes: receiving an instruction for enlarging a currently displayed font; acquiring a size of the currently displayed font; when the size of the currently displayed font is smaller than a preset maximum threshold, enlarging the currently displayed font based on a curve enlargement rule with a first enlargement coefficient configured by an operating system of the device and a second enlargement coefficient configured by a current application; when the size of the currently displayed font is larger than or equal to the preset maximum threshold, enlarging the currently displayed font based on a linear enlargement rule with a third enlargement coefficient configured by the operating system; and displaying the enlarged font.

13 Claims, 11 Drawing Sheets

(56) References Cited

FOREIGN PATENT DOCUMENTS

| CN | 103645837 | 3/2014 |
|---|---|---|
| JP | 10-105153 | 4/1998 |
| JP | 2013-142919 | 7/2013 |
| WO | WO 2009/154438 A1 | 12/2009 |
| WO | WO 2013/103036 | 7/2013 |

OTHER PUBLICATIONS

European Search Report for Application No. 14195227.5, from the European Patent Office, dated Jul. 23, 2015.

"Typography for visually impaired people," Text Matters, dated Sep. 1, 2001. Retrieved from the Internet on Jul. 16, 2015. URL: www.textmatters.com/resources/pdfs/vislmpd_typogTM.pdf.

Kirk McElhearn, "Stop squinting: Make text bigger in OS X," MacWorld, dated Feb. 4, 2013. Retrieved from the Internet on Jul. 16, 2015. URL: http://www.macworld.com/article/2026699/stop-squinting-make-text-bigger-in-os-x.html.

English version of International Search Report of PCT/CN2014/077094, mailed from the State Intellectual Property Office of China on Sep. 2, 2014.

* cited by examiner

METHOD AND DEVICE FOR ENLARGING DISPLAYED FONT

CROSS REFERENCE TO RELATED APPLICATION

This application is a continuation of International Application No. PCT/CN2014/077094, filed May 9, 2014, which is based upon and claims priority to Chinese Patent Application No. 201310613054.0, filed Nov. 27, 2013, the entire contents of all of which are incorporated herein by reference.

TECHNICAL FIELD

The present disclosure generally relates to the field of communication technology and, more particularly, to a method and a device for enlarging a displayed font.

BACKGROUND

A device that can enlarge a displayed font may be preferred by certain users, such as middle-aged and old users. Conventionally, the displayed font is enlarged by a method of setting a global scale, such as in an Android operating system installed on the device. In this method, the displayed font may be in linear enlargement within an interval of [0, +infinity).

Although this method can enlarge the displayed font, the displayed font might be blindly enlarged even beyond an extent that can be accepted by a user. In addition, the displayed font is in linear enlargement, which may not flexibly adapt to requirements by application developers.

SUMMARY

According to a first aspect of the present disclosure, there is provided a method for a device to enlarge a displayed font, comprising: receiving an instruction for enlarging a currently displayed font; acquiring a size of the currently displayed font; when the size of the currently displayed font is smaller than a preset maximum threshold, enlarging the currently displayed font based on a curve enlargement rule with a first enlargement coefficient configured by an operating system of the device and a second enlargement coefficient configured by a current application; when the size of the currently displayed font is larger than or equal to the preset maximum threshold, enlarging the currently displayed font based on a linear enlargement rule with a third enlargement coefficient configured by the operating system; and displaying the enlarged font.

According to a second aspect of the present disclosure, there is provided a device, comprising: a processor; and a memory for storing instructions executable by the processor; wherein the processor is configured to: receive an instruction for enlarging a currently displayed font; acquire a size of the currently displayed font; when the size of the currently displayed font is smaller than a preset maximum threshold, enlarge the currently displayed font based on a curve enlargement rule with a first enlargement coefficient configured by an operating system of the device and a second enlargement coefficient configured by a current application; when the size of the currently displayed font is larger than or equal to the preset maximum threshold, enlarge the currently displayed font based on a linear enlargement rule with a third enlargement coefficient configured by the operating system; and display the enlarged font.

According to a third aspect of the present disclosure, there is provided a non-transitory computer-readable storage medium including instructions that, when executed by a processor of a device, cause the device to perform a method for enlarging a displayed font, the method comprising: receiving an instruction for enlarging a currently displayed font; acquiring a size of the currently displayed font; when the size of the currently displayed font is smaller than a preset maximum threshold, enlarging the currently displayed font based on a curve enlargement rule with a first enlargement coefficient configured by an operating system of the device and a second enlargement coefficient configured by a current application; when the size of the currently displayed font is larger than or equal to the preset maximum threshold, enlarging the currently displayed font based on a linear enlargement rule with a third enlargement coefficient configured by the operating system; and displaying the enlarged font.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
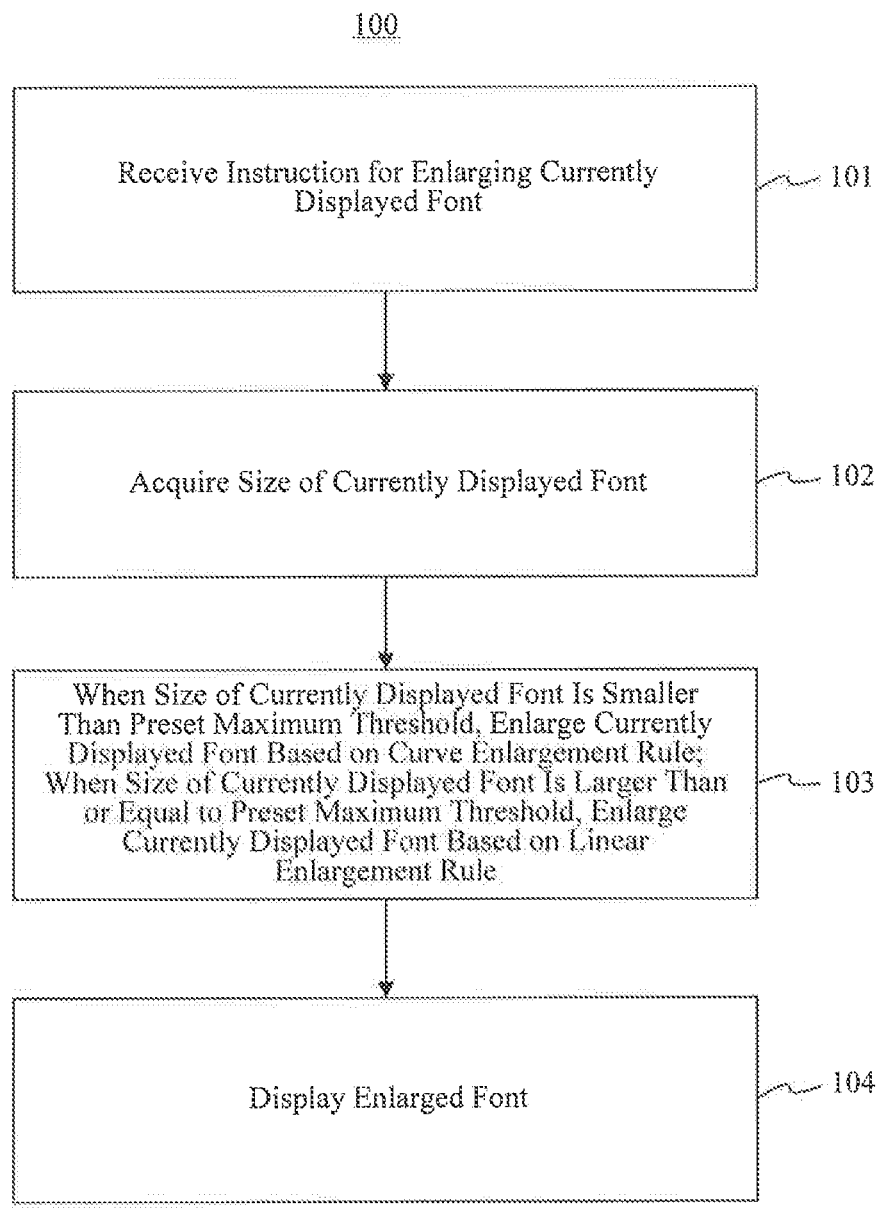
FIG. 1 is a flowchart of a method for enlarging a displayed font, according to an exemplary embodiment.

FIG. 1 is a flowchart of a method 100 for a device to enlarge a displayed font, according to an exemplary embodiment. Referring to FIG. 1, the method 100 includes the following steps.

In step 101, the device receives an instruction for enlarging a currently displayed font. The instruction may be triggered by a user. For example, the user clicks an option displayed on the device to enter a large font mode. The present embodiment has no specific limitations thereto.

In step 102, the device acquires a size of the currently displayed font.

In step 103, when the size of the currently displayed font is smaller than a preset maximum threshold, the device enlarges the currently displayed font based on a curve enlargement rule, with a first enlargement coefficient configured by an operating system of the device and a second enlargement coefficient configured by a current application; and when the size of the currently displayed font is larger than or equal to the preset maximum threshold, the device enlarges the currently displayed font based on a linear enlargement rule, with a third enlargement coefficient configured by the operating system.

The maximum threshold may be preset as needed, and the present embodiment has no limitations thereto.

The curve enlargement rule specifies a curve correspondence relationship between the size of the currently displayed font, i.e., the size of the font to be enlarged, and a size of the enlarged font. The linear enlargement rule specifies a linear correspondence relationship between the size of the font to be enlarged and the size of the enlarged font.

In step 104, the device displays the enlarged font.

In exemplary embodiments, the method 100 is applied in the device operating on an Android operating system. The Android operating system is configured with the first enlargement coefficient and the third enlargement coefficient for enlarging the displayed font. For example, the first enlargement coefficient is used for enlarging the displayed font when the size of the currently displayed font is smaller than the maximum preset threshold, and the third enlargement coefficient is used for enlarging the displayed font when the size of the currently displayed font is larger than or equal to the preset maximum threshold. Generally, an amplitude enlarged by the first enlargement coefficient and the third enlargement coefficient is relatively conservative, which can provide good appearance and usability of a user interface. As such, the first and third enlargement coefficients may be regarded as safe enlargement coefficients.

In exemplary embodiments, the second enlargement coefficient is a coefficient configured by the current application, belonging to a secondary enlargement coefficient. For example, the current application may be any application installed in the Android operating system, and is pre-configured by the application's developer. The second enlargement coefficient may be described in an Androidmanifest.xml file of the application. Since the second enlargement coefficient is configured by the application's developer, the coefficient is generally controllable. A magnitude of the second enlargement coefficient may be set as needed, so as to achieve various enlargement effects.

In exemplary embodiments, the enlarging of the currently displayed font based on the curve enlargement rule may include enlarging the currently displayed font based on at least one of a parabolic enlargement rule, an elliptical enlargement rule, or a circular enlargement rule, using the first enlargement coefficient configured by the operating system and the second enlargement coefficient configured by the current application.

For example, the parabolic enlargement rule specifies a parabolic correspondence relationship between the size of the currently displayed font, i.e., the size of the font to be enlarged, and the size of the enlarged font. The elliptical enlargement rule specifies an elliptical correspondence relationship between the size of the font to be enlarged and the size of the enlarged font. The circular enlargement rule specifies a circular correspondence relationship between the size of the font to be enlarged and the size of the enlarged font.

In one exemplary embodiment, the enlarging of the currently displayed font based on the parabolic enlargement rule includes enlarging the currently displayed font based on equation (1) below:

$$y^2 = k1 * k2 * x, \; x < T; \qquad \text{equation (1)}$$

where y is the size of the enlarged font, x is the size of the currently displayed font, k1 is the first enlargement coefficient configured by the operating system, k2 is the second enlargement coefficient configured by the current application, and T is the preset maximum threshold.

In one exemplary embodiment, the enlarging of the currently displayed font based on the elliptical enlargement rule includes enlarging the currently displayed font based on equation (2) below:

$$\frac{x^2}{k1^2} + \frac{y^2}{k2^2} = 1, \quad x < T; \qquad \text{equation (2)}$$

where y is the size of the enlarged font, x is the size of the currently displayed font, k1 is the first enlargement coefficient configured by the operating system, k2 is the second enlargement coefficient configured by the current application, and T is the preset maximum threshold.

In one exemplary embodiment, the enlarging of the currently displayed font based on the circular enlargement rule includes enlarging the currently displayed font based on equation (3) below:

$$x^2 + y^2 + k1*x + k2*y + C = 0, \; x < T; \qquad \text{equation (3)}$$

where y is the size of the enlarged font, x is the size of the currently displayed font, k1 is the first enlargement coefficient configured by the operating system, k2 is the second enlargement coefficient configured by the current application, C is a predetermined value, and T is the preset maximum threshold.

In one exemplary embodiment, the enlarging the currently displayed font based on the linear enlargement rule includes enlarging the currently displayed font based on equation (4) below:

$$y = k3 * x, \; x \geq T; \qquad \text{equation (4)}$$

where y is the size of the enlarged font, x is the size of the currently displayed font, k3 is the third enlargement coefficient configured by the operating system, and T is the preset maximum threshold.

In the method 100, font enlargement is achieved by combining the curve enlargement rule and the linear enlargement rule. The curve enlargement rule can enlarge the font more rapidly and appropriately, and the linear enlargement rule can make the font not to be blindly enlarged beyond an acceptable extent, so as to provide good appearance of the font and integrity of the user interface. Moreover, the combination of the curve enlargement rule and the linear enlargement rule can effectively avoid a jump change of font size during font enlargement, so as to achieve controllability of font enlargement, and the control is relatively flexible, so the application developer's requirements can be adapted.

Figure 2:
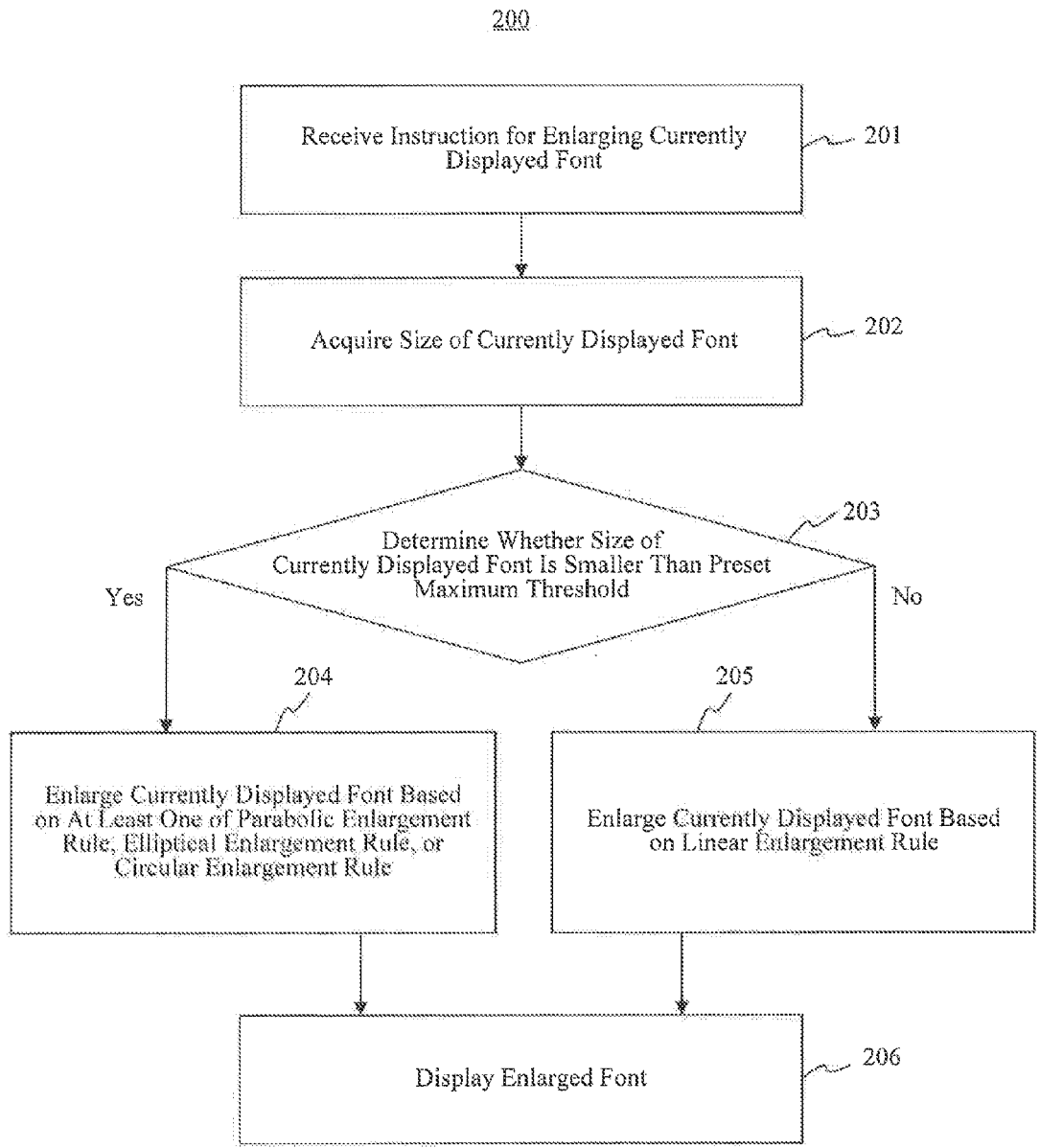
FIG. 2 is a flowchart of a method for enlarging a displayed font, according to an exemplary embodiment.

FIG. 2 is a flowchart of a method 200 for a device to enlarge a displayed font, according to an exemplary embodiment. Referring to FIG. 2, the method 200 includes the following steps.

In step 201, the device receives an instruction for enlarging a currently displayed font. The instruction may be triggered by a user. For example, the user clicks an option displayed on the device to enter a large font mode. The present embodiment has no specific limitations thereto.

In step 202, the device acquires a size of the currently displayed font.

In step 203, the device determines whether the size of the currently displayed font is smaller than a preset maximum threshold. If it is determined that the size of the currently displayed font is smaller than the preset maximum threshold, the device performs step 204; otherwise, the device performs step 205.

In step 204, the device enlarges the currently displayed font based on at least one of a parabolic enlargement rule, an elliptical enlargement rule, or a circular enlargement rule, using a first enlargement coefficient configured by an operating system of the device and a second enlargement coefficient configured by the current application, and then performs step 206.

Similar to the above description in connection with FIG. 1, the parabolic enlargement rule specifies a parabolic correspondence relationship between the size of the currently displayed font, i.e., the size of the font to be enlarged, and a size of the enlarged font. The elliptical enlargement rule specifies an elliptical correspondence relationship between the size of the font to be enlarged and the size of the enlarged font. The circular enlargement rule specifies a circular correspondence relationship between the size of the font to be enlarged and the size of the enlarged font.

In step 205, the device enlarges the currently displayed font based on a linear enlargement rule, using a third enlargement coefficient configured by the operating system, and then performs step 206. The linear enlargement rule specifies a linear correspondence relationship between the size of the font to be enlarged and the size of the enlarged font.

In step 206, the device displays the enlarged font.

Figure 3A:
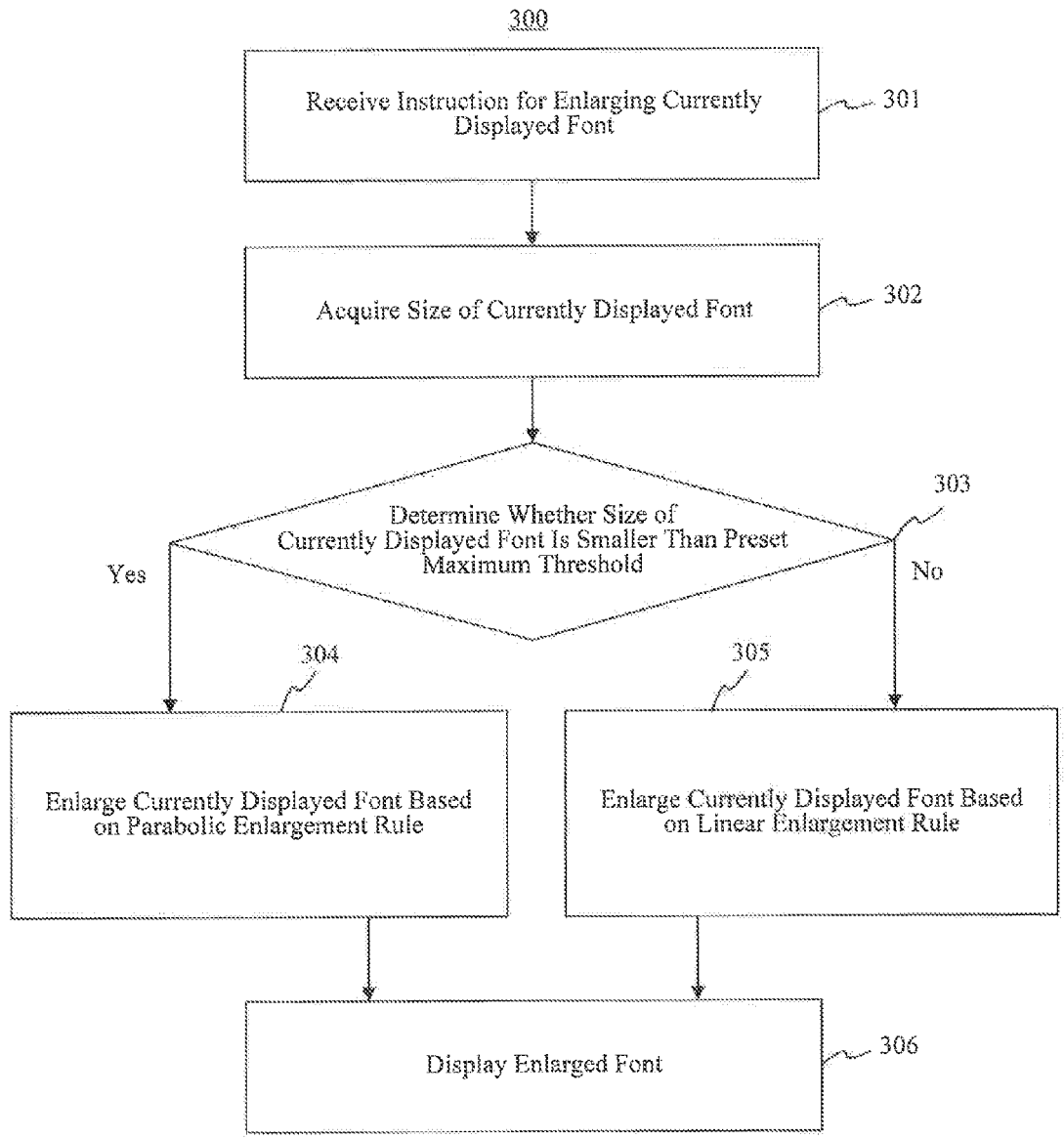
FIG. 3A is a flowchart of a method for enlarging a displayed font, according to an exemplary embodiment.

FIG. 3A is a flowchart of a method 300 for a device to enlarge a displayed font, according to an exemplary embodiment. For example, the method 300 enlarges the displayed font using a parabolic enlargement rule and a linear enlargement rule. Referring to FIG. 3A, the method 300 includes the following steps.

In step 301, the device receives an instruction for enlarging a currently displayed font. The instruction may be triggered by a user. For example, the user clicks an option displayed on the device to enter a large font mode. The present embodiment has no specific limitations thereto.

In step 302, the device acquires a size of the currently displayed font.

In step 303, the device determines whether the size of the currently displayed font is smaller than a preset maximum threshold. If it is determined that the size of the currently displayed font is smaller than the preset maximum threshold, the device performs step 304; otherwise, the device performs step 305.

In step 304, the device enlarges the currently displayed font based on the parabolic enlargement rule, using a first enlargement coefficient configured by an operating system of the device and a second enlargement coefficient configured by a current application, and then performs step 306.

Similar to the above description in connection with FIG. 1, the parabolic enlargement rule specifies a parabolic correspondence relationship between the size of the size of the currently displayed font, i.e., the font to be enlarged, and a size of the enlarged font. In the illustrated embodiment, the device enlarges the currently displayed font based on equation (1), reproduced below:

$$y^2 = k_1 * k_2 * x, \quad x < T; \qquad \text{equation (1)}$$

where y is the size of the enlarged font, x is the size of the currently displayed font, k1 is the first enlargement coefficient configured by the operating system, k2 is the second enlargement coefficient configured by the current application, and T is the preset maximum threshold.

In step 305, the device displays the currently displayed font based on the linear enlargement rule, using a third enlargement coefficient configured by the operating system, and then performs step 306.

Similar to the above description in connection with FIG. 1, the linear enlargement rule specifies a linear correspondence relationship between the size of the font to be enlarged and the size of the enlarged font. In the illustrated embodiment, the device enlarges the currently displayed font based on equation (4), reproduced below:

$$y = k_3 * x, \quad x \geq T; \qquad \text{equation (4)}$$

where y is the size of the enlarged font, x is the size of the currently displayed font, k3 is the third enlargement coefficient configured by the operating system, and T is the preset maximum threshold.

In step 306, the device displays the enlarged font.

In exemplary embodiments, the maximum threshold may be preset as needed, for example, may be preset to be 20, 30, etc. The present embodiment has no specific limitations thereto.

Figure 3B:
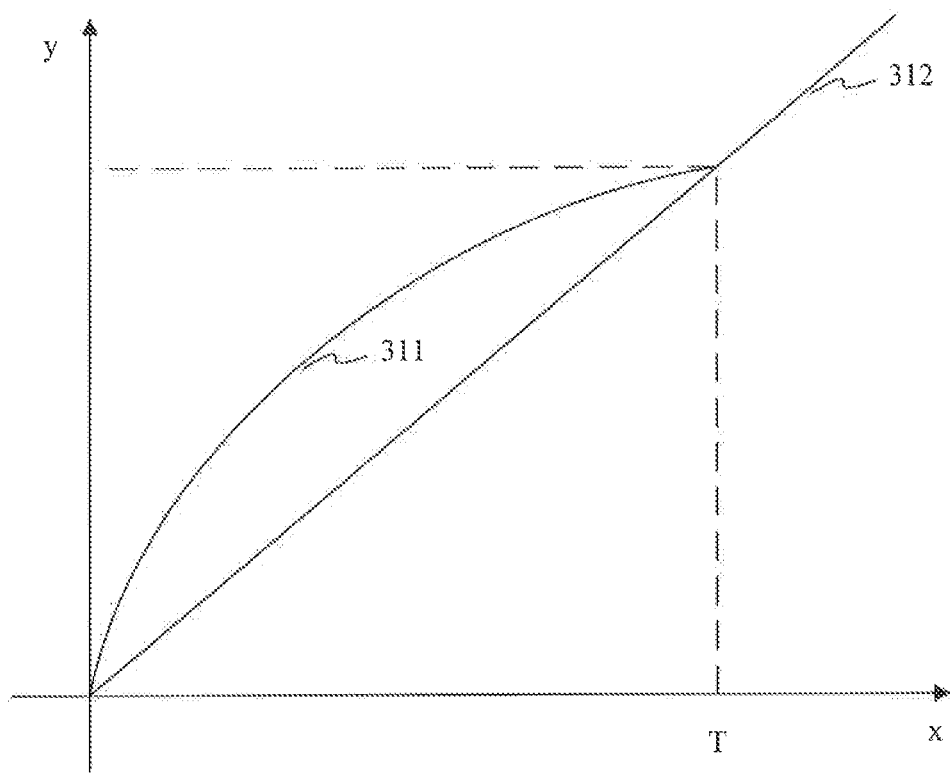
FIG. 3B is a diagram illustrating a parabolic enlargement rule and a linear enlargement rule, according to an exemplary embodiment.

FIG. 3B a diagram illustrating the parabolic enlargement rule and the linear enlargement rule implemented using equations (1) and (4), respectively, according to an exemplary embodiment. Referring to FIG. 3B, a parabola 311 corresponds to equation (1) based on the first enlargement coefficient k1 and the second enlargement coefficient k2, and a straight line 312 corresponds to equation (4) based on the third enlargement coefficient k3. Only a portion of each of the parabola 311 and the straight line 312 is shown in FIG. 3B. When the size of the currently displayed font is smaller than the maximum threshold T, the device enlarges the currently displayed font based on the portion of the parabola 311. When the size of the currently displayed font is larger than or equal to the maximum threshold T, the device enlarges the currently displayed font based on the straight line 312.

Figure 4A:
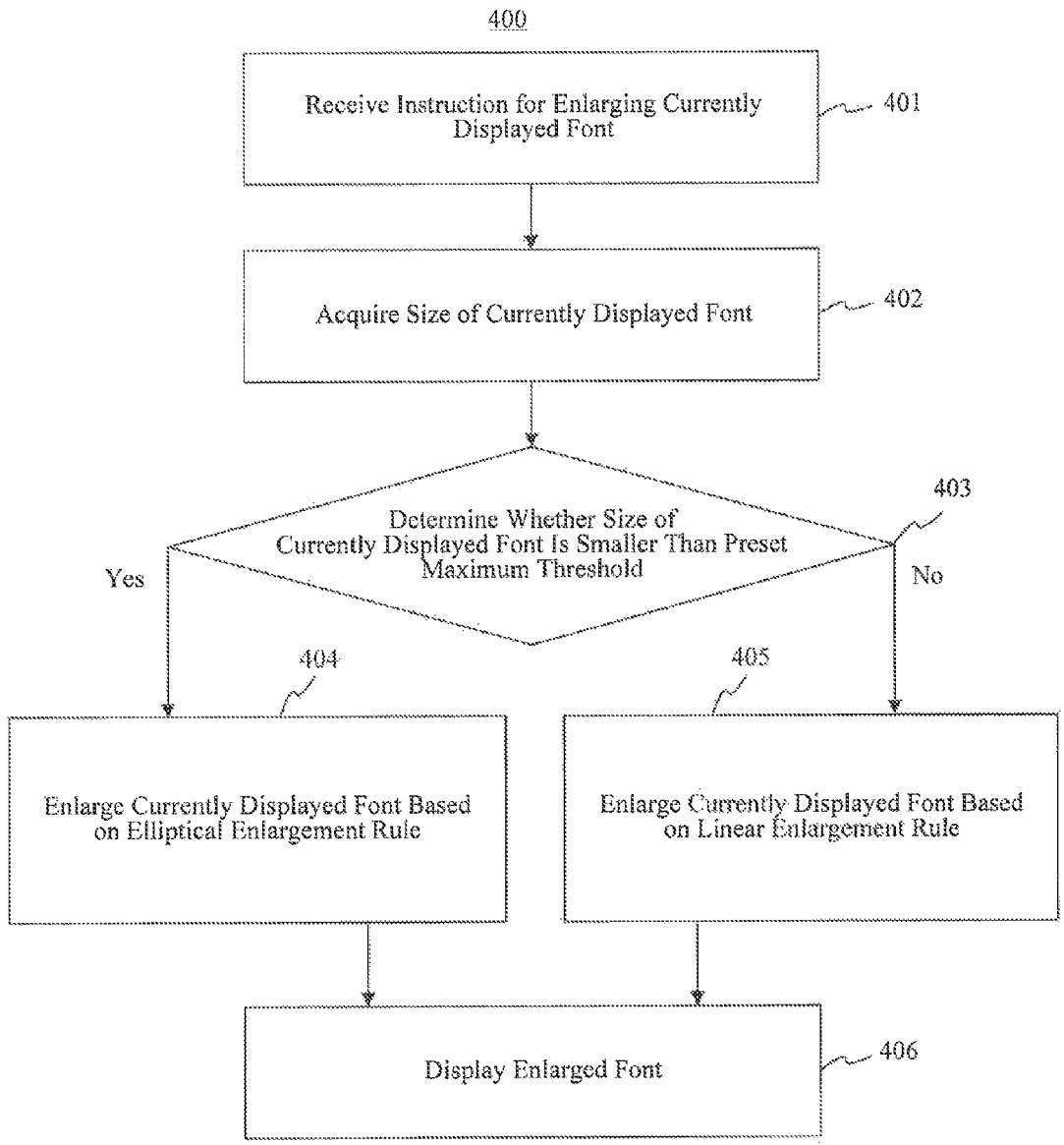
FIG. 4A is a flowchart of a method for enlarging a displayed font, according to an exemplary embodiment.

FIG. 4A is a flowchart of a method 400 for a device to enlarge displayed font, according to an exemplary embodiment. For example, the method 400 enlarges the currently displayed font based on an elliptical enlargement rule and a linear enlargement rule. Referring to FIG. 4A, the method 400 includes the following steps.

In step 401, the device receives an instruction for enlarging a displayed font. The instruction may be triggered by a user. For example, the user clicks an option displayed on the device to enter a large font mode. The present embodiment has no specific limitations thereto.

In step 402, the device acquires a size of a currently displayed font.

In step 403, the device determines whether the size of the currently displayed font is smaller than a preset maximum threshold. If the size of the currently displayed font is smaller than the preset maximum threshold, the device performs step 404; otherwise, the device performs step 405.

In step 404, the device enlarges the currently displayed font based on the elliptical enlargement rule, using a first enlargement coefficient configured by an operating system of the device and a second enlargement coefficient configured by a current application, and then performs step 406.

Similar to the above description in connection with FIG. 1, the elliptical enlargement rule specifies an elliptical correspondence relationship between the size of the currently displayed font, i.e., the size of the font to be enlarged, and a size of the enlarged font. In the illustrated embodiment, the device enlarges the currently displayed font based on equation (2), reproduced below:

$$\frac{x^2}{k1^2} + \frac{y^2}{k2^2} = 1,$$
$$x < T, y^2 = k1 * k2 * x,$$
$$x < T;$$

equation (2)

where y is the size of the enlarged font, x is the size of the currently displayed font, k1 is the first enlargement coefficient configured by the operating system, k2 is the second enlargement coefficient configured by the current application, and T is the preset maximum threshold.

In step 405, the device enlarges the currently displayed font based on the linear enlargement rule, using a third enlargement coefficient configured by the operating system, and then performs step 406.

Similar to the above description in connection with FIG. 1, the linear enlargement rule specifies a linear correspondence relationship between the size of the font to be enlarged and the size of the enlarged font. In the illustrated embodiment, the device enlarges the currently displayed font based on equation (4), reproduced below:

$$y = k3 * x, x \geq T;$$

equation (4)

where y is the size of the enlarged font, x is the size of the currently displayed font, k3 is the third enlargement coefficient configured by the operating system, and T is the preset maximum threshold.

In step 406, the device displays the enlarged font.

In the present embodiment, the maximum threshold may be preset as needed, for example, may be preset to be 20, 40, etc. The present embodiment has no specific limitations thereto.

Figure 4B:
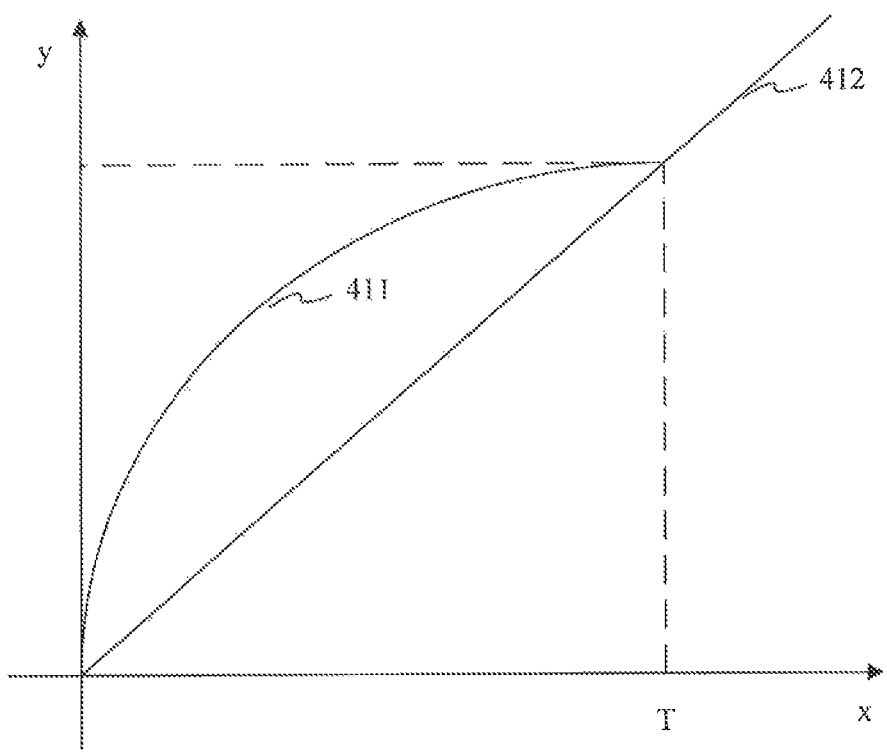
FIG. 4B is a diagram illustrating an elliptical enlargement rule and a linear enlargement rule, according to an exemplary embodiment.

FIG. 4B is a diagram illustrating the elliptical enlargement rule and the linear enlargement rule implemented using equations (2) and (4), respectively, according to an exemplary embodiment. Referring to FIG. 4B, an ellipse 411 corresponds to equation (2) based on the first enlargement coefficient k1 and the second enlargement coefficient k2, and a straight line 412 corresponds to equation (4) based on the third enlargement coefficient k3. Only a portion of each of the ellipse 411 and the straight line 412 is shown in FIG. 4B. When the size of the currently displayed font is smaller than the maximum threshold T, the device enlarges the currently displayed font based on the ellipse 411. When the size of the currently displayed font is larger than or equal to the maximum threshold T, the device enlarges the currently displayed font based on the straight line 412.

Figure 5A:
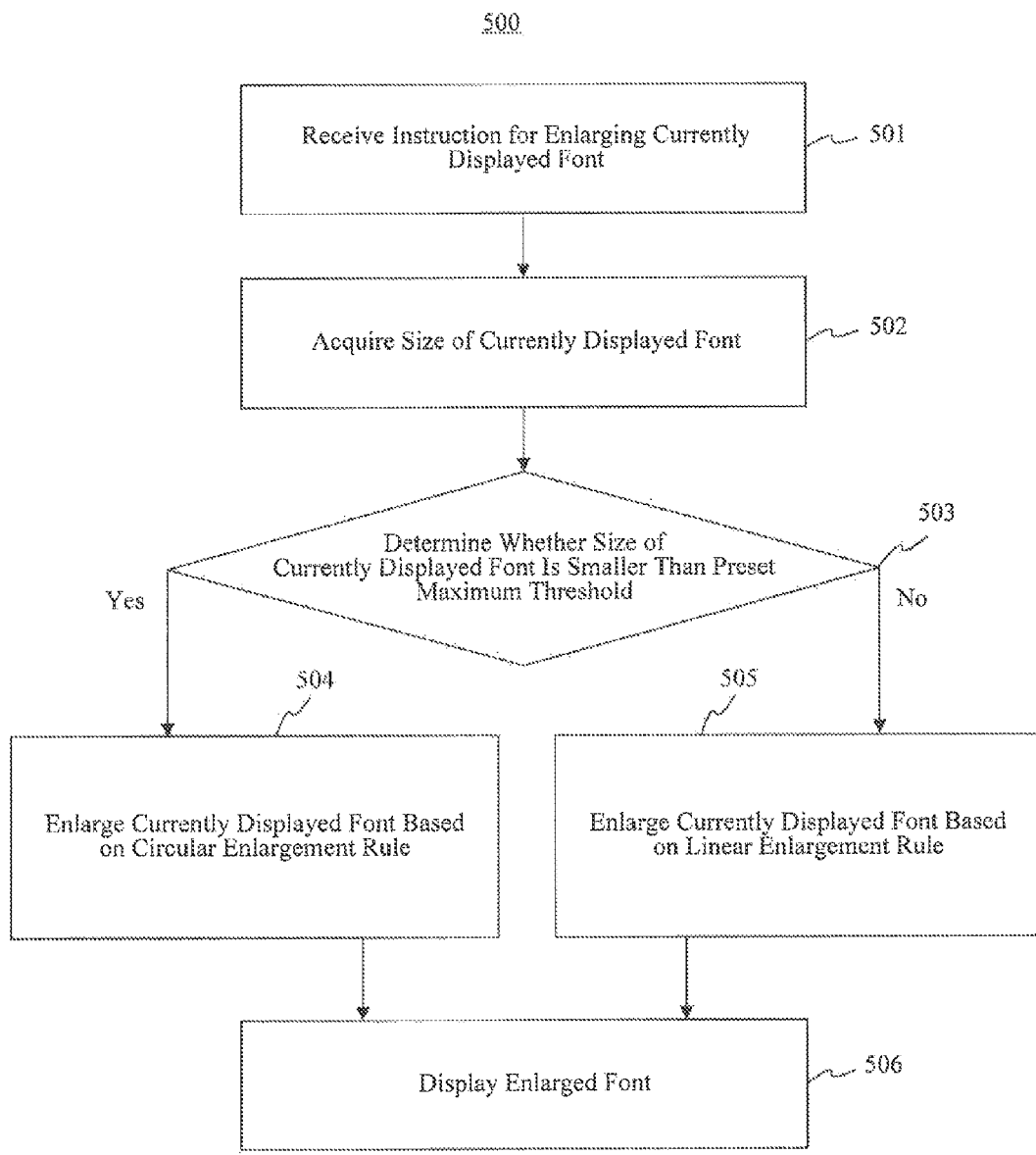
FIG. 5A is a flowchart of a method for enlarging a displayed font, according to an exemplary embodiment.

FIG. 5A is a flowchart of a method 500 for a device to enlarge a displayed font, according to an exemplary embodiment. For example, the method 500 enlarges the displayed font using a circular enlargement rule and a linear enlargement rule. Referring to FIG. 5A, the method 500 includes the following steps.

In step 501, the device receives an instruction for enlarging a currently displayed font. The instruction may be triggered by a user. For example, the user clicks an option displayed on the device to enter a large font mode. The present embodiment has no specific limitations thereto.

In step 502, the device acquires a size of the currently displayed font.

In step 503, the device determines whether the size of the currently displayed font is smaller than a preset maximum threshold. If it is determined that the size of the currently displayed font is smaller than the preset maximum threshold, the device performs step 504; otherwise, the device performs step 505.

In step 504, the device enlarges the currently displayed font based on the circular enlargement rule, using a first enlargement coefficient configured by an operating system of the device and a second enlargement coefficient configured by a current application, and then performs step 506.

Similar to the above description in connection with FIG. 1, the circular enlargement rule specifies a circular correspondence relationship between the size of the currently displayed font, i.e., the size of the font to be enlarged, and a size of the enlarged font. In the illustrated embodiment, the device enlarges the currently displayed font based on equation (3), reproduced below:

$$x^2 + y^2 + k1 * x + k2 * y + C = 0, x < T;$$

equation (3)

where y is the size of the enlarged font, x is the size of the currently displayed font, k1 is the first enlargement coefficient configured by the operating system, k2 is the second enlargement coefficient configured by the current application, C is the predetermined value, and T is the preset maximum threshold.

In step 505, the device enlarges the currently displayed font based on the linear enlargement rule, using a third enlargement coefficient configured by the operating system, and then performs step 506.

Similar to the above description in connection with FIG. 1, the linear enlargement rule specifies a linear correspondence relationship between the size of the font to be enlarged and the size of the enlarged font. In the illustrated embodiment, the device enlarges the currently displayed font based on equation (4), reproduced below:

$$y = k3 * x, x \geq T;$$

equation (4)

where y is the size of the enlarged font, x is the size of the currently displayed font, k3 is the third enlargement coefficient configured by the operating system, and T is the preset maximum threshold.

In step 506, the device displays the enlarged font.

In the present embodiment, the maximum threshold may be preset as needed, for example, may be preset to be 20, 50, etc. The present embodiment has no specific limitations thereto.

Figure 5B:
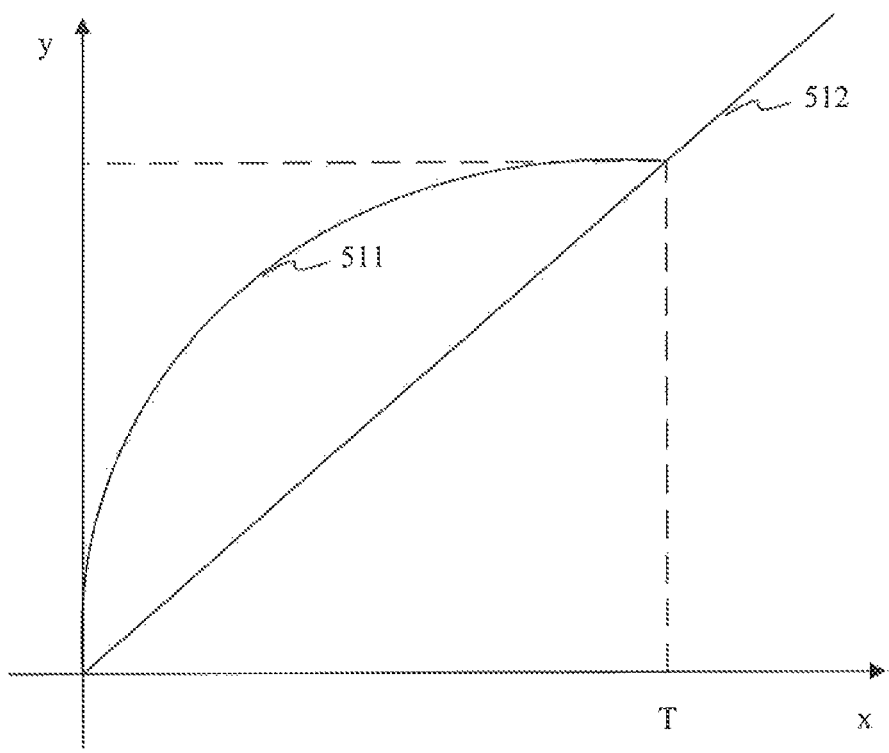
FIG. 5B is a diagram illustrating a circular enlargement rule and a linear enlargement rule, according to an exemplary embodiment.

FIG. 5B is a diagram illustrating the circular enlargement rule and the linear enlargement rule implemented using equations (3) and (4), respectively, according to an exemplary embodiment. Referring to FIG. 5B, a circle 511 corresponds to equation (3) based on the first enlargement coefficient k1 and the second enlargement coefficient k2, and a straight line 512 corresponds to equation (4) based on the third enlargement coefficient k3. Only a portion of each of the circle 511 and the straight line 512 is shown in FIG. 5B. When the size of the currently displayed font is smaller than the maximum threshold T, the device enlarges the currently displayed font based on the circle 511. When the size of the currently displayed font is larger than or equal to the maximum threshold T, the device enlarges the currently displayed font based on the straight line 512.

Figure 6A:
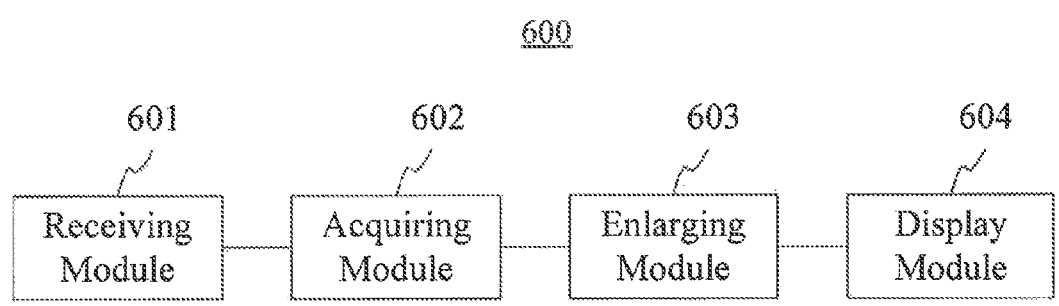
FIGS. 6A and 6B are block diagrams of a device for enlarging a displayed font, according to an exemplary embodiment.
Figure 6B:
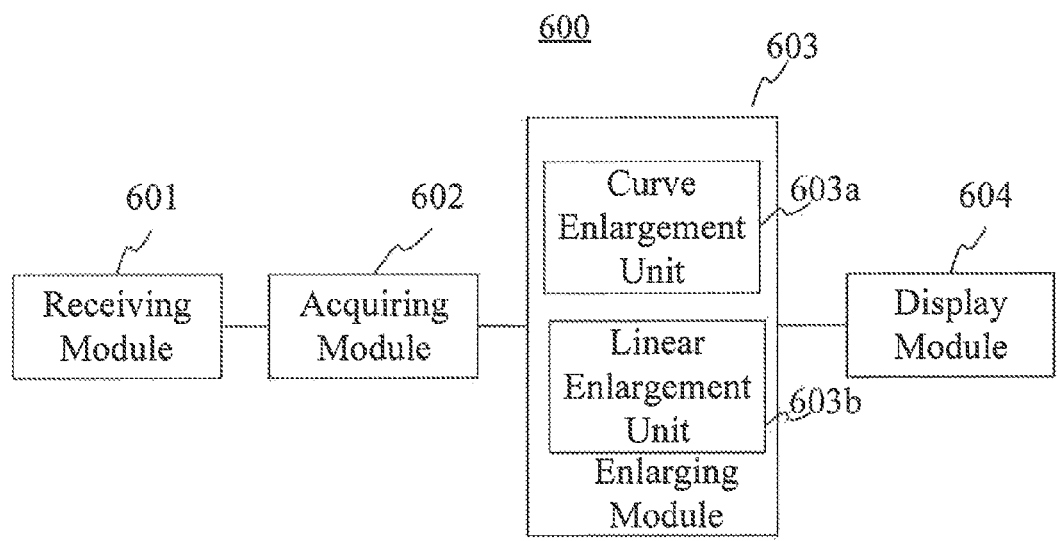

FIGS. 6A and 6B are block diagrams of a device 600 for enlarging a displayed font, according to an exemplary embodiment. Referring to FIG. 6A, the device 600 includes a receiving module 601 configured to receive an instruction for enlarging a currently displayed font, and an acquiring module 602 configured to acquire a size of the currently displayed font. The instruction may be triggered by a user. For example, the user clicks an option displayed on the device 600 to enter a large font mode. The present embodiment has no specific limitations thereto.

The device 600 also includes an enlarging module 603 configured to, when the size of the currently displayed font is smaller than a preset maximum threshold, enlarge the currently displayed font based on a curve enlargement rule using a first enlargement coefficient configured by an operating system of the device 600 and a second enlargement coefficient configured by a current application and, when the size of the currently displayed font is larger than or equal to the preset maximum threshold, enlarge the currently displayed font based on a linear enlargement rule using a third enlargement coefficient configured by the operating system. The device 600 additionally includes a display module 604 configured to display the enlarged font.

Referring to FIG. 6B, the enlarging module 603 may include a curve enlargement unit 603a and a linear enlargement unit 603b.

The curve enlargement unit 603a is configured to enlarge the currently displayed font based on at least one of a parabolic enlargement rule, an elliptical enlargement rule, or a circular enlargement rule using the first enlargement coefficient configured by the operating system and the second enlargement coefficient configured by the current application.

The parabolic enlargement rule specifies a parabolic correspondence relationship between the size of the currently displayed font, i.e., the size of the font to be enlarged, and a size of the enlarged font. The elliptical enlargement rule specifies an elliptical correspondence relationship between the size of the font to be enlarged and the size of the enlarged font. The circular enlargement rule specifies a circular correspondence relationship between the size of the font to be enlarged and the size of the enlarged font.

In one exemplary embodiment, the curve enlargement unit 603a is configured to enlarge the currently displayed font based on equation (1), reproduced below:

$$y^2 = k1^* k2^* x, x<T;\qquad\text{equation (1)}$$

where y is the size of the enlarged font, x is the size of the currently displayed font, k1 is the first enlargement coefficient configured by the operating system, k2 is the second enlargement coefficient configured by the current application, and T is the preset maximum threshold.

In one exemplary embodiment, the curve enlargement unit 603a is configured to enlarge the currently displayed font based on equation (2), reproduced below:

$$\frac{x^2}{k1^2} + \frac{y^2}{k2^2} = 1,$$
$$x<T;\qquad\text{equation (2)}$$

where y is the size of the enlarged font, x is the size of the currently displayed font, k1 is the first enlargement coefficient configured by the operating system, k2 is the second enlargement coefficient configured by the current application, and T is the preset maximum threshold.

In one exemplary embodiment, the curve enlargement unit 603a is configured to enlarge the currently displayed font based on equation (3), reproduced below:

$$x^2 + y^2 + k1^* k2^* y + C = 0, x<T;\qquad\text{equation (3)}$$

where y is the size of the enlarged font, x is the size of the currently displayed font, k1 is the first enlargement coefficient configured by the operating system, k2 is the second enlargement coefficient configured by the current application, C is the predetermined value, and T is the preset maximum threshold.

The enlarging module 603 may include a linear enlargement unit 603b configured to enlarge the currently displayed font based on equation (4), reproduced below:

$$y = k3^* x, x \geq T;\qquad\text{equation (4)}$$

where y is the size of the enlarged font, x is the size of the currently displayed font, k3 is the third enlargement coefficient configured by the operating system, and T is the preset maximum threshold.

In exemplary embodiments, the Android operating system is installed on the device 600. Accordingly, the Android operating system is configured with the first enlargement coefficient and the third enlargement coefficient for enlarging the displayed font. For example, the first enlargement coefficient is used for enlarging the currently displayed font when the size of the currently displayed font is smaller than the preset maximum threshold, and the third enlargement coefficient is used for enlarging the currently displayed font when the size of the currently displayed font is larger than or equal to the preset maximum threshold. Generally, an amplitude enlarged by the first enlargement coefficient and the third enlargement coefficient is relatively conservative, which can provide good appearance and usability of a user interface. As such, the first and third enlargement coefficients may be regarded as safe enlargement coefficients.

In exemplary embodiments, the second enlargement coefficient is a coefficient configured by the current application, belonging to a secondary enlargement coefficient. For example, the current application may be any application installed in the Android operating system, and is pre-configured by the application's developer. The second enlargement coefficient may be described in an Androidmanifest.xml file of the application. Since the second enlargement coefficient is configured by the application's developer, the coefficient is controllable. A magnitude of the second enlargement coefficient may be set as needed, so as to achieve various enlargement effects.

Figure 7:
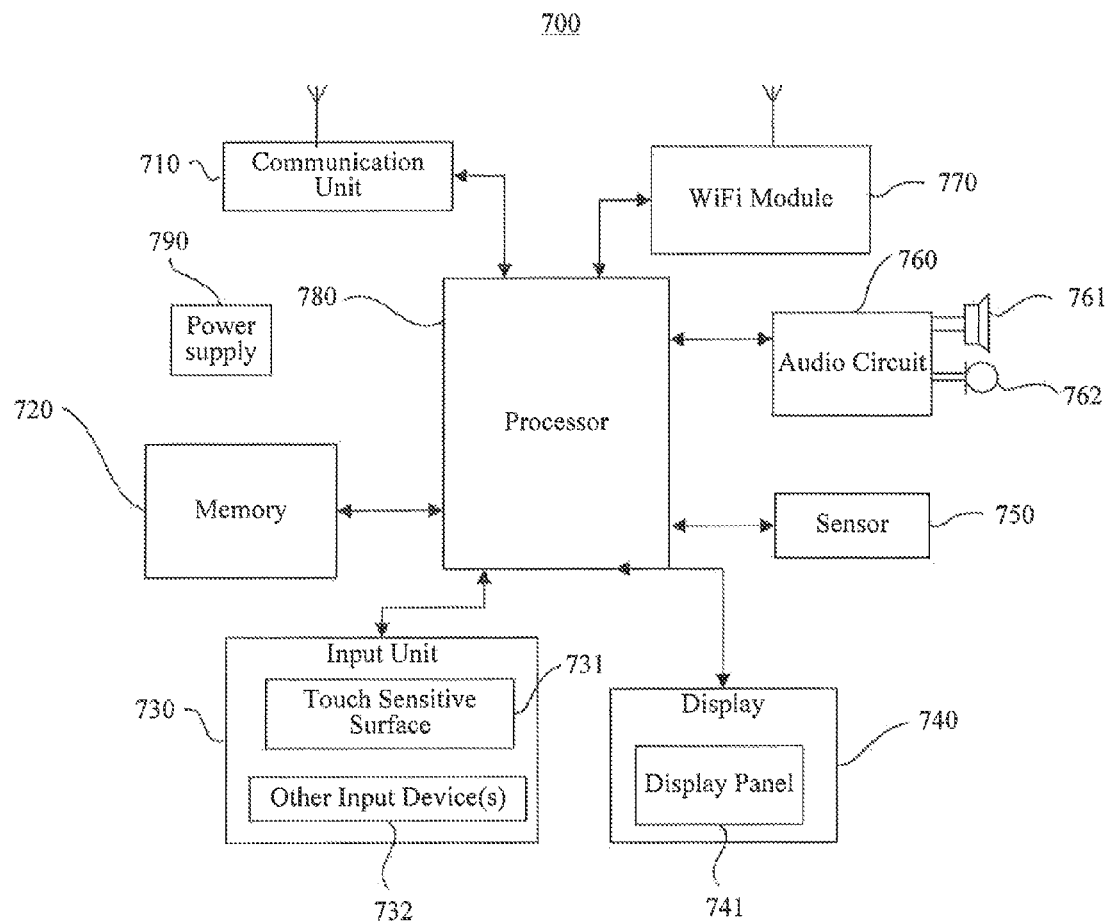
FIG. 7 is a block diagram of a device, according to an exemplary embodiment.

FIG. 7 is a block diagram of a device 700, according to an exemplary embodiment. The device 700 is configured to perform any of the above described method for enlarging a displayed font. Referring to FIG. 7, the device 700 may include one or more of a communication unit 710, memory resources represented by a memory 720, an input unit 730, a display 740, a sensor 750, an audio circuit 760, a wireless fidelity (WiFi) module 770, a processor 780 including one or more processing cores, and a power supply 790. It should be appreciated by those skilled in the art that the structure shown in FIG. 7 does not constitute a limitation to the device 700, and the device 700 may include more or less components than those shown in FIG. 7, or a combination of some of the components, or have different component arrangements.

The communication unit 710 is configured to transmit and receive signals during transmitting and receiving information or a call procedure. The communication unit 710 may be a network communication device such as a radio frequency (RF) circuit, a router, a modem, etc. For example, when the communication unit 710 is an RF circuit, the communication unit 710 receives downlink information from a base station, and then sends the downlink information to the processors 780 to be processed. Also, the communication unit 710 transmits uplink data to the base station. Generally, the RF circuit as the communication unit 710 includes, but is not limited to, an antenna, at least one amplifier, a tuner, one or more oscillators, a subscriber identity module (SIM) card, a transceiver, a coupler, a low noise amplifier (LNA), a duplexer, etc. Furthermore, the communication unit 710 may communicate with a network and other apparatuses through wireless communication. The wireless communication may use any communication standards or protocols, including but not limited to global system of mobile communication (GSM), general packet radio service (GPRS), code division multiple access (CDMA), wideband code division multiple access (WCDMA), long term evolution (LTE), e-mail, short messaging service (SMS), etc.

The memory 720 is configured to store software programs and modules. The processor 780 performs various functional applications and data processing by running the software programs and modules stored in the memory 720. The memory 720 may mainly include a program storage area and a data storage area. The program storage area may store an operating system, application programs required by at least one function (such as a function of sound playback, a function of image playback, etc.). The data storage area may store data created during operation of the device 700 (such as audio data, phone book, etc.). In addition, the memory 720 may include a high-speed random access memory, and may also include a non-volatile memory, such as at least one disk storage device, a flash memory device, or other non-volatile solid-state memory devices. Accordingly, the memory 720 may also include a memory controller to provide access to the memory 720 performed by the processor 780 and the input unit 730.

The input unit 730 is configured to receive information of input numbers or characters, and generate signal inputs from a keyboard, a mouse, a joystick, an optical device, or a trackball related to a user setting and functional control. The input unit 730 may include a touch sensitive surface 731 and one or more other input devices 732. The touch sensitive surface 731, also known as a touch screen or a track pad, may collect the user's touch operations on or near the touch sensitive surface 731 (such as an operation performed by the user using any suitable object or accessory such as a finger, a touch pen and the like on or near the touch sensitive surface 731), and drive a corresponding connected device according to a preset program. For example, the touch sensitive surface 731 may include first and second parts, i.e., a touch detection device and a touch controller. The touch detection device detects a touching operation of the user and a signal caused by the touch operation, and transmits the signal to the touch controller. The touch controller receives touch information from the touch detection device, transforms it into coordinates of the touch position, and sends the coordinates to the processor 780. The touch controller may also receive a command from the processor 780 and execute the command. In addition, the touch sensitive surface 731 may be realized in various types, such as a resistive type, a capacitive type, an infrared type, or a surface acoustic wave type. In addition to the touch sensitive surface 731, the input unit 730 may also include one or more other input devices 732. For example, the other input devices 732 may include, but are not limited to, one or more of a physical keyboard, a functional key (such as a volume control key, a switch button), a trackball, a mouse, and a joystick.

The display unit 740 is configured to display information input by the user or information provided to the user and various graphical user interfaces of the device 700. These graphical user interfaces may consist of graphics, texts, source display frames, videos, and any combination thereof. The display 740 may include a display panel 741. The display panel 741 may be configured with a liquid crystal display (LCD), an organic light-emitting diode (OLED), etc. Further, the touch sensitive surface 731 may cover the display panel 741. When a touch operation on or near the touch sensitive surface 731 is detected by the touch sensitive surface 731, the touch operation is sent to the processor 780 to determine the type of the touch operation, and then a corresponding visual output will be provided on the display panel 741 by the processor 780 according to the type of touch operation. Although in FIG. 7 the touch sensitive surface 731 and the display panel 741 are two separate components to realize input and output functions, in some embodiments, the touch sensitive surface 731 and the display panel 741 may be integrated to realize input and output functions.

The sensor 750 may be a light sensor, a motion sensor, or any other sensors. The light sensor may include an ambient light sensor and a proximity sensor. The ambient light sensor may adjust a brightness of the display panel 741 according to a brightness of the ambient light. The proximity sensor may turn off the display panel 741 and/or backlight when the device 700 moves close to the user's ear. As an example of the motion sensor, a gravity acceleration sensor may detect a magnitude of an acceleration in each of one or more directions (such as along three axes), and may detect a magnitude and a direction of the gravity when it is stationary. The gravity acceleration sensor may be used in applications for identifying an attitude of the device 700 (such as horizontal and vertical screen switching, related games, attitude calibration of a magnetometer), functions related to vibration recognizing (such as a pedometer, clicking), etc. The device 700 may also be equipped with other sensors such as a gyroscope, a barometer, a hygrometer, a thermometer, an infrared sensor, etc.

The audio circuit 760 is coupled to a speaker 761 and a microphone 762, and may provide an audio interface between the user and the device 700. The audio circuit 760 may transform received audio data into electrical signals, which are transmitted to the speaker 761 and transformed into sound signals to be output by the speaker 761. On the other hand, the microphone 762 transforms collected sound signals into electrical signals, which are received and transformed into audio data by the audio circuit 760. After being output to the processor 780 to be processed, the audio data is transmitted to, for example, another terminal via the RF circuit as the communication unit 710, or output to the memory 720 for further processing. The audio circuit 760 may also include an earplug jack to allow a communication between an external earphone and the device 700.

The WiFi module 770 is configured to provide the user with a wireless broadband Internet access, which allows the user to send and receive emails, browse webpages, and access streaming media, etc. Although FIG. 7 shows the WiFi module 770, it should be understood that the WiFi module 770 is not a necessary component of the device 700, and may be omitted as desired.

The processor 780 is a control center of the device 700 that connects various parts of the device 700 through various interfaces and circuits, and performs various functions and data processing by executing the software programs and/or modules stored in the memory 720 and by invoking data stored in the memory 720. For example, the processor 780 may include one or more processing cores. The processor 780 may be integrated with an application processor that mainly processes the operating system, user interfaces and application programs, and a modem processor that mainly processes wireless communication. In some embodiments, the modem processor may not be integrated into the processor 780.

The power supply 790 is configured to supply power to components of the device 700. The power supply 790 may be logically connected to the processor 780 through a power supply management system, so as to achieve the functions such as charging, discharging, and power consumption management through the power supply management system. The power supply 790 may also include one or more components of a direct current (DC) or alternating current (AC) power, a recharge system, a power failure detection circuit, a power converter or an inverter, a power status indicator, etc.

Although not shown, the device 700 may also include a camera, a Bluetooth module, etc.

In exemplary embodiments, there is also provided a non-transitory computer readable storage medium including instructions, such as included in the memory 720, executable by the processor 780 in the device 700, for performing the above-described methods for enlarging a displayed font. For example, the storage medium may be a read-only memory, a magnetic disc, an optical disc, etc.

One of ordinary skill in the art will understand that the above described modules/units can each be implemented by hardware, or software, a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a device to enlarge a displayed font, comprising:

receiving an instruction for enlarging a currently displayed font;

acquiring a size of the currently displayed font;

when the size of the currently displayed font is smaller than a preset maximum threshold, enlarging the currently displayed font based on a curve enlargement rule with a first enlargement coefficient configured by an operating system of the device and a second enlargement coefficient configured by a current application;

when the size of the currently displayed font is larger than or equal to the preset maximum threshold, enlarging the currently displayed font based on a linear enlargement rule with a third enlargement coefficient configured by the operating system; and displaying the enlarged font.

2. The method according to claim 1, wherein the enlarging of the currently displayed font comprises:

enlarging the currently displayed font based on one of a parabolic enlargement rule, an elliptical enlargement rule, or a circular enlargement rule with the first enlargement coefficient configured by the operating system and the second enlargement coefficient configured by the current application.

3. The method according to claim 2, wherein the enlarging of the currently displayed font based on the parabolic enlargement rule comprises:

enlarging the currently displayed font based on the following equation:

$$y^2 = k1*k2*x, \; x<T;$$

wherein y is a size of the enlarged font, x is the size of the currently displayed font, k1 is the first enlargement coefficient configured by the operating system, k2 is the second enlargement coefficient configured by the current application, and T is the preset maximum threshold.

4. The method according to claim 2, wherein the enlarging of the currently displayed font based on the elliptical enlargement rule comprises:

enlarging the currently displayed font based on the following equation:

$$\frac{x^2}{k1^2} + \frac{y^2}{k2^2} = 1,$$
$$x < T;$$

wherein y is a size of the enlarged font, x is the size of the currently displayed font, k1 is the first enlargement coefficient configured by the operating system, k2 is the second enlargement coefficient configured by the current application, and T is the preset maximum threshold.

5. The method according to claim 2, wherein the enlarging of the currently displayed font based on the circular enlargement rule comprises:

enlarging the currently displayed font based on the following equation:

$$x^2+y^2+k1*x+k2*y+C=0, \; x<T;$$

wherein y is a size of the enlarged font, x is the size of the currently displayed font, k1 is the first enlargement coefficient configured by the operating system, k2 is the second enlargement coefficient configured by the current application, C is a predetermined value, and T is the preset maximum threshold.

6. The method according to claim 1, wherein the enlarging of the currently displayed font based on the linear enlargement rule comprises:

enlarging the currently displayed font based on the following equation:

$$y=k3*x, \; x \geq T;$$

wherein y is a size of the enlarged font, x is the size of the currently displayed font, k3 is the third enlargement coefficient configured by the operating system, and T is the preset maximum threshold.

7. A device, comprising:
a processor; and
a memory for storing instructions executable by the processor;
wherein the processor is configured to:
receive an instruction for enlarging a currently displayed font;
acquire a size of the currently displayed font;
when the size of the currently displayed font is smaller than a preset maximum threshold, enlarge the currently displayed font based on a curve enlargement rule with a first enlargement coefficient configured by an operating system of the device and a second enlargement coefficient configured by a current application;
when the size of the currently displayed font is larger than or equal to the preset maximum threshold, enlarge the currently displayed font based on a linear enlargement rule with a third enlargement coefficient configured by the operating system; and
display the enlarged font.

8. The device according to claim 7, wherein the processor is further configured to:
enlarge the currently displayed font based on one of a parabolic enlargement rule, an elliptical enlargement rule, or a circular enlargement rule, with the first enlargement coefficient configured by the operating system and the second enlargement coefficient configured by the current application.

9. The device according to claim 8, wherein the processor is further configured to:
enlarge the currently displayed font based on the following equation:

$$y^2 = k1 * k2 * x, \; x < T;$$

wherein y is a size of the enlarged font, x is the size of the currently displayed font, k1 is the first enlargement coefficient configured by the operating system, k2 is the second enlargement coefficient configured by the current application, and T is the preset maximum threshold.

10. The device according to claim 8, wherein the processor is further configured to:
enlarge the currently displayed font based on the following equation:

$$\frac{x^2}{k1^2} + \frac{y^2}{k2^2} = 1,$$
$$x < T;$$

wherein y is a size of the enlarged font, x is the size of the currently displayed font, k1 is the first enlargement coefficient configured by the operating system, k2 is the second enlargement coefficient configured by the current application, and T is the preset maximum threshold.

11. The device according to claim 8, wherein the processor is further configured to:
enlarge the currently displayed font based on the following equation:

$$x^2 + y^2 + k1 * x + k2 * y + C = 0, \; x < T;$$

wherein y is a size of the enlarged font, x is the size of the currently displayed font, k1 is the first enlargement coefficient configured by the operating system, k2 is the second enlargement coefficient configured by the current application, C is a predetermined value, and T is the preset maximum threshold.

12. The device according to claim 7, wherein the processor is further configured to:
enlarge the currently displayed font based on the following equation:

$$y = k3 * x, \; x \geq T;$$

wherein y is a size of the enlarged font, x is the size of the currently displayed font, k3 is the third enlargement coefficient configured by the operating system, and T is the preset maximum threshold.

13. A non-transitory computer-readable storage medium including instructions that, when executed by a processor of a device, cause the device to perform a method for enlarging a displayed font, the method comprising:
receiving an instruction for enlarging a currently displayed font;
acquiring a size of the currently displayed font;
when the size of the currently displayed font is smaller than a preset maximum threshold, enlarging the currently displayed font based on a curve enlargement rule with a first enlargement coefficient configured by an operating system of the device and a second enlargement coefficient configured by a current application;
when the size of the currently displayed font is larger than or equal to the preset maximum threshold, enlarging the currently displayed font based on a linear enlargement rule with a third enlargement coefficient configured by the operating system; and
displaying the enlarged font.

* * * * *